Sept. 1, 1931.  O. T. BOUNDS  1,821,417

AUTOMOBILE SEAT

Filed July 27, 1929

INVENTOR
Orville T. Bounds.
By
ATTORNEY

Patented Sept. 1, 1931

1,821,417

UNITED STATES PATENT OFFICE

ORVILLE T. BOUNDS, OF CENTRALIA, ILLINOIS, ASSIGNOR OF ONE-FOURTH TO GEORGE H. SOMERVILLE, OF CHICAGO, ILLINOIS, AND ONE-HALF TO MILTON R. HOWARD, OF CENTRALIA, ILLINOIS

AUTOMOBILE SEAT

Application filed July 27, 1929. Serial No. 381,523.

This invention relates generally to seats for use in vehicles and the like and, more particularly, to a certain new and useful improvement in seats especially adapted for use in automobiles.

My invention has for its chief object the provision of a seat having a back so constructed as to be capable of shifting yieldingly relatively to the seat proper and to the automobile to thereby obviate jolting to the back of the occupant under the shocks and jars to which the automobile is subjected in use.

My invention has for a further object the provision of a seat of the type and for the purposes stated which may be inexpensively constructed and conveniently installed in the automobile, and which is compact, durable, and satisfactory in use wherever found applicable.

And with the above and other objects in view, my invention resides in the novel features of form, construction, arrangement, and combination of parts, hereinafter described and pointed out in the claims.

In the accompanying drawings,—

Figure 1:
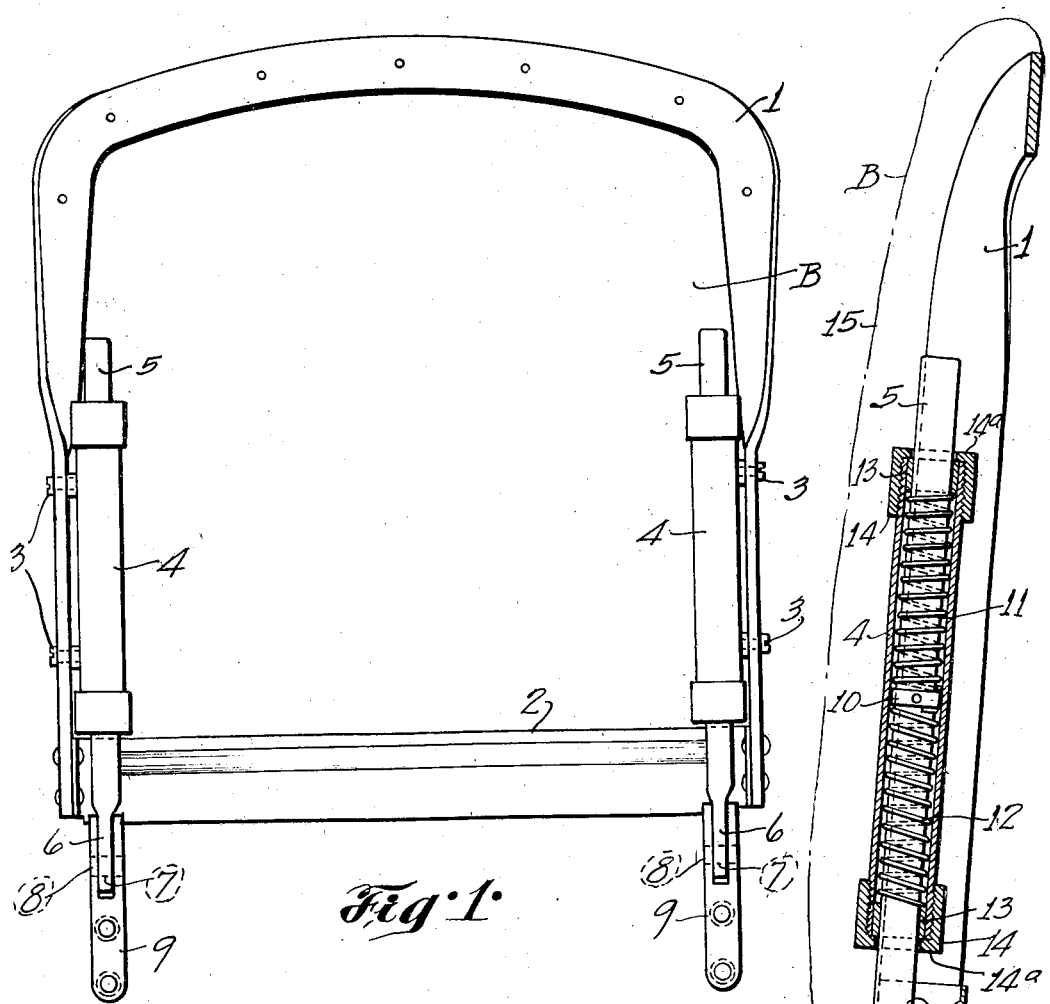
Figure 1 is an elevational view of a seat-back embodying my invention.

Referring now more in detail and by reference characters to the drawings, which illustrate a preferred embodiment of my invention, my new seat comprises, as is usual, a seat proper A and a back B, to which latter my invention particularly pertains.

The back B includes a frame 1 constructed preferably of suitable strap or strip steel and preferably of inverted U-shape in elevation, the legs $b$, $b$, of the frame being tied together at their free ends by a cross-piece 2.

Figure 2:
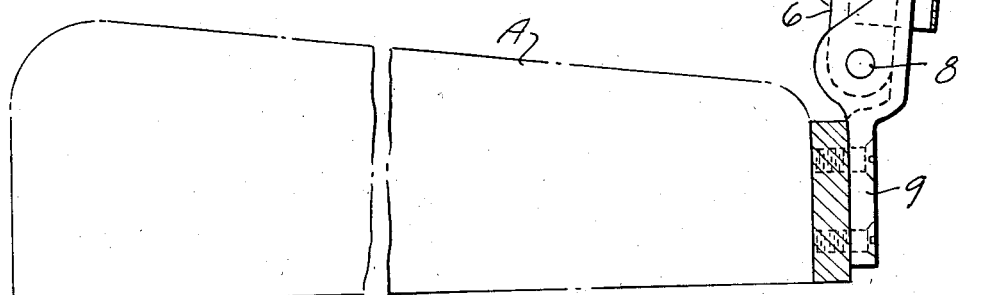
Figure 2 is an enlarged vertical or longitudinal sectional view thereof.

Extending longitudinally with, and rigidly, as at 3, fixed to, the frame legs $b$, are cylinders 4, 4, partially housed in which are longitudinally extending rods 5, 5, which at their opposite ends project exteriorly of the cylinders 4 and at their lower ends are flattened, as at 6, and apertured, as at 7, as shown, for hinge connection, as at 8, with correspondingly apertured brackets 9—9 fixed to and upstanding from the seat-proper A, as best seen in Figure 2. It may be stated here that such hinge-connection between the seat-members A and B is of rule-joint type, as shown in dotted lines in Figure 2, so that, while the back B is free for folding forwardly and downwardly upon the seat-proper A, the rearward and upward folding of back B is limited by the cooperation between the brackets 9 and their inserted rod-ends 6.

Intermediate its ends, each of the rods 5 is provided with an integral or otherwise permanently fixed collar 10, which provides abutments for the inner ends of opposed springs 11, 12, coiled about the rod 5 and bearing at their respective opposite or outer ends against bushings 13 retained within the cylinder 5 by flanged caps 14, 14, each having an apertured end wall $14a$, whereby not only may the caps 14 be readily oppositely slipped over the rod 5 and threaded upon the opposite ends of the cylinder 4, but the cylinders 4 and their attached back B may also yieldingly shift relatively to the fixed seat-proper A, as shown.

By such construction, the back B is so supported on and relatively to the seat-proper A as to be capable not only of fully folding forwardly upon the seat proper A, but also of yielding longitudinally relatively thereto under jars or vibrations to which the automobile may be subjected in use, thereby obviating jolting and rubbing of the occupant's back, disarranging his or her clothing, and the like, thus increasing the comfort, pleasure, and healthfulness of automobiling.

It will be understood, of course, that the back B also includes a body 15 of any suitable material, which is disposed over and around the frame 1, as indicated in Figure 2, and which wholly conceals the cylinders 4.

The seat is relatively simple in structure, may be inexpensively constructed, and is efficient in the performance of its intended functions.

It is to be understood also that changes in the form, construction, arrangement, and combination of the several parts of my new seat may be made and substituted for those herein shown and described without departing from the nature and principle of my invention.

Having thus described my invention, what I claim and desire to secure by Letters Patent is:

1. A seat comprising, in combination, a seat proper, a back, housings fixed to the back, rods projecting longitudinally through the housings and pivotally attached at an end to and foldable over the seat proper, and springs housed within the housings and engaging said rods for permitting yielding movement of the back relatively to the seat proper.

2. A seat comprising, in combination, a seat proper, a back, cylinders fixed to the back, rods projecting longitudinally of and through the cylinders and pivotally attached at an end to the seat proper, a collar fixed on each of the rods intermediate its ends, a pair of opposed springs coiled on each of the rods and housed within the cylinders, and apertured end caps slipped over the rods and secured to the cylinders, said springs bearing at one end against the collars and at their other end against the caps, whereby the back is adapted both for yielding and swinging movement relatively to the seat proper.

In testimony whereof, I have signed my name to this specification.

ORVILLE T. BOUNDS.